United States Patent
Ichida

(10) Patent No.: US 7,325,280 B2
(45) Date of Patent: Feb. 5, 2008

(54) TONGUE AND SEAT BELT APPARATUS EMPLOYING THE SAME

(75) Inventor: Yoshiyuki Ichida, Tokyo (JP)

(73) Assignee: Takata Corporation, Tokyo (JP)

( * ) Notice: Subject to any disclaimer, the term of this patent is extended or adjusted under 35 U.S.C. 154(b) by 120 days.

(21) Appl. No.: 11/294,481

(22) Filed: Dec. 6, 2005

(65) Prior Publication Data

US 2006/0138852 A1    Jun. 29, 2006

(30) Foreign Application Priority Data

Dec. 27, 2004   (JP) .............................. 2004-375760

(51) Int. Cl.
*A44B 11/25* (2006.01)
*B60R 22/12* (2006.01)

(52) U.S. Cl. ..................... 24/170; 24/265 BC
(58) Field of Classification Search ..................... None
See application file for complete search history.

(56) References Cited

U.S. PATENT DOCUMENTS

| | | | |
|---|---|---|---|
| 4,876,770 A * | 10/1989 | Bougher | ....................... 24/170 |
| 5,050,274 A | 9/1991 | Staniszewski et al. | |
| 5,058,244 A | 10/1991 | Fernandez | |
| 5,100,176 A | 3/1992 | Ball et al. | |
| 5,138,749 A | 8/1992 | McCune et al. | |
| 5,417,455 A | 5/1995 | Drinane et al. | |
| 5,471,717 A | 12/1995 | Ennerdal et al. | |
| 5,649,341 A * | 7/1997 | Ashline et al. | ................ 24/171 |
| 5,806,148 A | 9/1998 | McFalls et al. | |
| 5,870,816 A | 2/1999 | McFalls et al. | |
| 2004/0158955 A1* | 8/2004 | Acton et al. | ............. 24/265 BC |

FOREIGN PATENT DOCUMENTS

| | | |
|---|---|---|
| JP | 7-71522 | 8/1995 |
| JP | 8-40195 | 2/1996 |
| JP | 2000-289566 | 10/2000 |
| JP | 2001-10443 | 1/2001 |

* cited by examiner

*Primary Examiner*—Robert J. Sandy
(74) *Attorney, Agent, or Firm*—Foley & Lardner LLP

(57) ABSTRACT

During ordinary use (i.e., a non-collision state) a webbing guide and a locking bar are biased in the counter-clockwise direction by the biasing force of the bar spring and are held in their initial positions so that spaces are set. Since a webbing passes through the spaces, a tongue can smoothly slide relative to the webbing. During a vehicle collision, a pulling force exceeding a predetermined value is applied to the webbing in the direction of an occupant's lap and shoulder. By this pulling force, the webbing guide rotates in the clockwise direction and the locking bar rotates in the counter-clockwise direction and linearly moves rightward. Therefore, the webbing is clamped between the locking bar and the tongue body. The clamping force at this point includes a force pulling the webbing and the biasing force of a bar spring so that a large clamping force can be obtained.

4 Claims, 7 Drawing Sheets

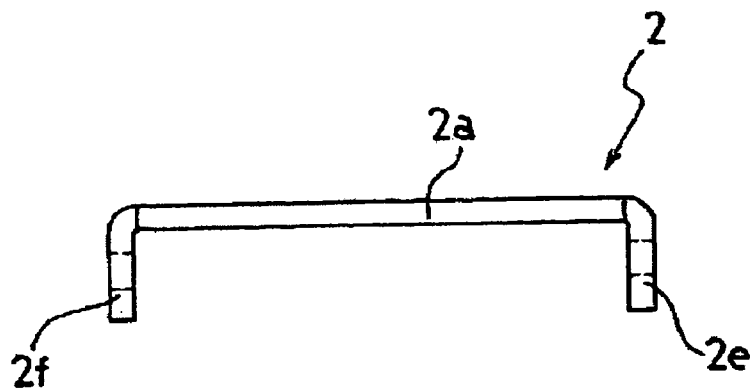
FIG. 2(c)
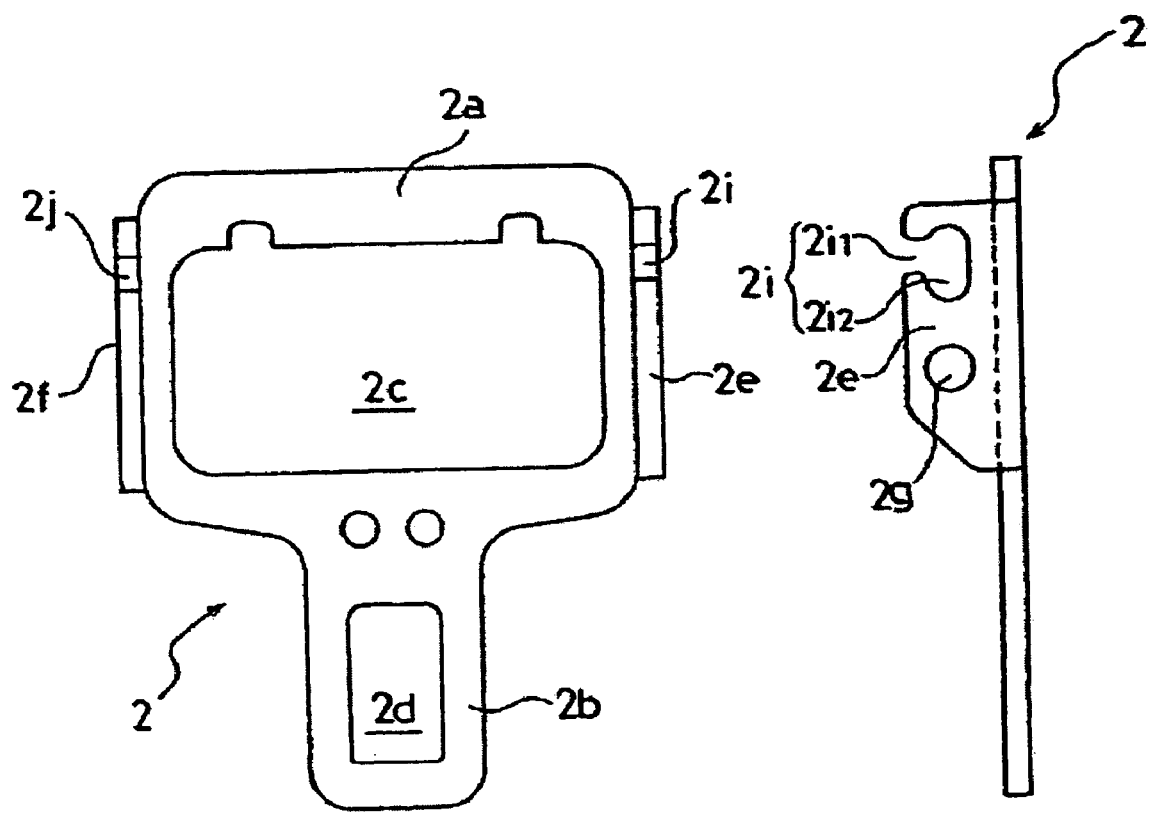
FIG. 2(a)
FIG. 2(b)

TONGUE AND SEAT BELT APPARATUS EMPLOYING THE SAME

BACKGROUND

The present invention relates to a seatbelt apparatus installed in a vehicle for restraining and protecting an occupant with a seatbelt. More particularly, the present invention relates to a tongue which is slidably supported to a seatbelt and can be latched with a buckle fixed to a vehicle body or the like and to a seatbelt apparatus employing the tongue.

Vehicle seats have been equipped with seatbelt apparatuses. In the event of an emergency, such as a vehicle collision where a large deceleration acts on the vehicle, such a seatbelt apparatus restrains an occupant with a seatbelt so as to prevent the occupant from falling out of the seat, thereby protecting the occupant.

Among the conventional seatbelt apparatuses, a three-point type seatbelt apparatus is generally known. A well known three-point type seatbelt apparatus has a webbing composing a seatbelt for restraining an occupant. The webbing has one end fixed to the vehicle body and a second end wound into a seatbelt retractor, which is fixed to a lower portion of the vehicle body. A belt guide (deflection fitting) guides the webbing which is fixed to an upper portion of the vehicle body, such as a center pillar, in such a manner as to allow the pullout of the webbing from the seatbelt retractor. Between the one end fixed to the vehicle body and the belt guide, a tongue is supported to the webbing to freely slide along the webbing. The tongue can be latched with a buckle fixed to the vehicle body or the like, thereby restraining an occupant sitting in a vehicle seat. In this case, a portion of the webbing between the belt guide and the tongue functions as a shoulder belt for restraining the shoulder and the chest of the occupant, while a portion of the webbing between the one end fixed to the vehicle body and the tongue functions as a lap belt for restraining the lap (lumbar) of the occupant.

In the event of an emergency such as a vehicle collision where an extremely large deceleration acts on the vehicle, an emergency locking mechanism of the seatbelt retractor is activated to stop the pullout of the webbing so as to prevent the forward movement of the occupant due to inertia, thereby restraining and protecting the occupant. In recent years, the seatbelt retractor or the buckle is provided with a pretensioner. In the event of an emergency, the pretensioner activates to pull the webbing to rapidly remove slack of the webbing so as to minimize the forward movement of the occupant.

Generally, the webbing is inserted into a belt through hole formed in the tongue. Therefore, the webbing is bent at the tongue so that the shoulder belt obliquely extending from the shoulder of the occupant to a lower portion and the lap belt extending in the lateral direction along the lumber of the occupant are defined relative to the tongue.

However, since the shoulder belt and the lap belt are defined only by bending the webbing at the tongue, the lap belt slightly increases in length due to inertial force of the occupant so as to allow the forward movement of the occupant in the event of emergency.

A tongue has been proposed in which a locking bar is rotatably supported to a frame having a latch plate which can be latched with the buckle (for example, see Japanese Patent Publication No. H07-71522, which is hereby incorporated by reference herein in its entirety). In this case, the locking bar is rotated because of a pulling force applied to the webbing, whereby the webbing is clamped between the locking bar and the frame.

The tongue disclosed in Japanese Patent Publication No. H07-71522 clamps the webbing between the locking bar and the frame in the event of emergency, thereby blocking the lap belt from increasing in length.

A tongue has been proposed in which a tongue plate is provided with a locking member in such a manner as to allow pivotal movement of the locking member and the locking member is continuously biased by a torsion spring. The tongue has a space between the tongue plate and the locking member to allow the free relative movement of the webbing and the tongue plate in the ordinary use (for example, see Japanese Patent No. 3544322, which is hereby incorporated by reference herein in its entirety).

According to the tongue disclosed in Japanese Patent No. 3544322, since the space for allowing the movement of the webbing between the locking member and the tongue plate is ensured by the torsion spring, the tongue plate smoothly moves relative to the webbing when the occupant puts on or take off the seatbelt, thereby providing improved usability of the tongue.

SUMMARY

One embodiment of the invention relates to a tongue which is slidably supported on a webbing and can be latched with a buckle. The tongue comprises a tongue body; a locking mechanism rotatably attached to the tongue body, wherein during a vehicle collision state where a large deceleration acts on the vehicle, the locking mechanism activates to cooperate together with the tongue body to clamp a webbing therebetween. The locking mechanism includes a webbing guide rotatably supported to the tongue body to guide a webbing; and a locking member connected to the webbing guide to allow relative rotation and, in operation, cooperates together with the tongue body to clamp a webbing therebetween. The tongue further comprises a biasing mechanism configured to bias the locking member during a non-collision state in a direction away from the tongue body to set an initial position where a predetermined space is formed between the locking member and the tongue body through which a webbing passes, and the biasing mechanism is configured to bias the locking member in a direction of clamping a webbing when the locking member is actuated by a pulling force exceeding a predetermined value applied to a webbing during a vehicle collision state such that the tongue body clamps a webbing.

Another embodiment of the invention relates to a seatbelt apparatus. The seatbelt apparatus comprises a webbing; and a tongue slidably supported on the webbing. The tongue includes a tongue body; and a locking mechanism rotatably attached to the tongue body, wherein during a vehicle collision state where a large deceleration acts on the vehicle, the locking mechanism activates to cooperate together with the tongue body to clamp the webbing therebetween. The locking mechanism includes a webbing guide rotatably supported to the tongue body to guide the webbing; and a locking member connected to the webbing guide to allow relative rotation and, in operation, cooperates together with the tongue body to clamp the webbing therebetween. The tongue further comprises a biasing mechanism configured to bias the locking member during a non-collision state in a direction away from the tongue body to set an initial position where a predetermined space is formed between the locking member and the tongue body through which the webbing passes, and the biasing mechanism is configured to bias the locking member in a direction of clamping the webbing when the locking member is actuated by a pulling force exceeding a predetermined value applied to the webbing during a vehicle collision state such that the tongue body clamps the webbing.

Another embodiment of the invention relates to a seatbelt apparatus. The seatbelt apparatus comprises a webbing; and a tongue slidably supported on the webbing. The tongue includes a tongue body, a biasing mechanism, and a locking mechanism, wherein the locking mechanism includes a webbing guide and a locking bar. A portion of the locking bar is configured to clamp the webbing when the locking bar is actuated by a pulling force exceeding a predetermined value applied to the webbing during a collision event.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 2(a)-2(c) show a tongue plate of the embodiment shown in FIG. 1. FIG. 2(a) is a front view thereof. FIG. 2(b) is a right side view thereof. FIG. 2(c) is a top view thereof.

FIG. 3(a) is a front view thereof. FIG. 3(b) is a right side view thereof. FIG. 3(c) is a top view thereof.

FIG. 4(a) is a front view thereof. FIG. 4(b) is a right side view thereof. FIG. 4(c) is a top view thereof.

FIG. 5(a) is a front view thereof. FIG. 5(b) is a right side view thereof. FIG. 5(c) is a top view thereof. FIG. 5(d) is a perspective view thereof.

FIG. 7(a) is a sectional view showing the tongue in the stored state when a seatbelt is not worn. FIG. 7(b) is a sectional view showing the tongue in a state where the seatbelt is worn and a pretensioner is activated. FIG. 7(c) is a sectional view showing the tongue in a state where the seatbelt is worn and the actuation of the pretensioner is terminated.

DETAILED DESCRIPTION

Figure 1:
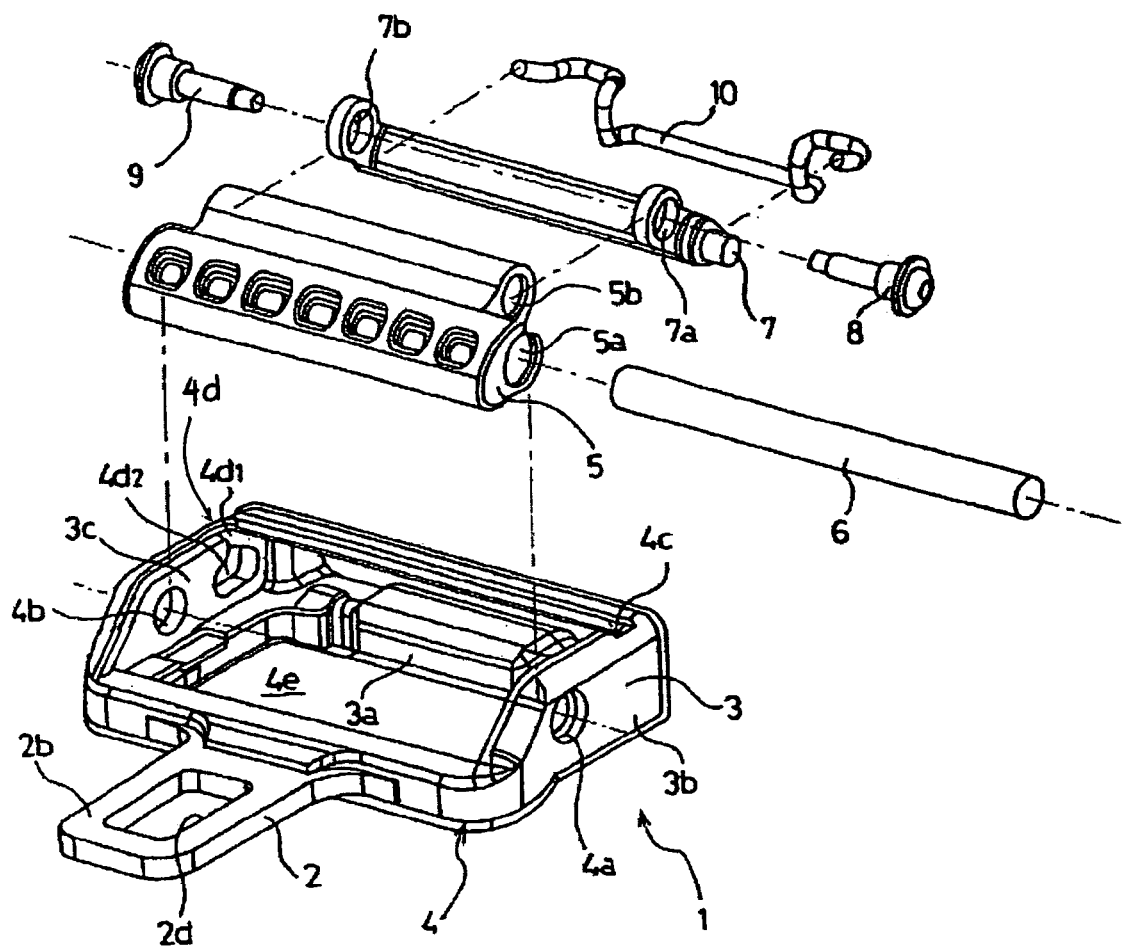
FIG. 1 is an exploded perspective view showing an embodiment of a tongue in a seatbelt apparatus according to the present invention.

In the tongue disclosed in Japanese Patent No. 3544322, the webbing passes through two through holes which are adjacent to the tongue plate so that the curvature radius of the webbing passing through the through holes is small. Therefore, the sliding friction between the tongue plate and the webbing must be increased so that it may be difficult to allow smooth sliding of the tongue plate relative to the webbing. In addition, since the locking member is always biased by the torsion spring in a direction apart from the tongue plate, the clamping force for clamping the webbing between the locking member and the tongue plate must be reduced.

Further, since the webbing is clamped by respective faces of the locking member and the tongue plate, a large clamping force for the webbing is not always obtained. To increase the clamping force, the clamping faces of the locking member and the tongue plate must be formed with teeth (e.g., saw teeth) or the clamping faces must be formed in wave-shaped surfaces. Additional processing steps for forming the teeth or the wave-shaped surfaces can be required.

An object of the present invention is to provide a tongue capable of providing improved usability during ordinary use of the tongue (i.e., a non-collision state) and still capable of ensuring the locking of the webbing by increased clamping force for the webbing in the event of an emergency and to provide a seatbelt apparatus using the same.

A tongue according to a first embodiment is slidably supported to a webbing and can be latched with a buckle, the tongue comprising a locking mechanism rotatably attached to a tongue body, wherein in the event of emergency such as a vehicle collision where a large deceleration acts on the vehicle, the locking mechanism is activated to cooperate together with the tongue body to clamp the webbing therebetween, and is characterized in that the locking mechanism comprises a webbing guide which is rotatably supported to the tongue body to guide the webbing, and a locking member which is connected to the webbing guide to allow relative rotation and, in operation, cooperates together with the tongue body to clamp the webbing therebetween, and further comprises a biasing mechanism, wherein, in the ordinary use, the biasing mechanism biases the locking member in a direction apart from the tongue body to set an initial position where a predetermined space through which the webbing smoothly passes is formed between the locking member and the tongue body, and the biasing mechanism biases the locking member in a direction of clamping the webbing when the locking member is actuated by pulling force exceeding a predetermined value applied to the webbing in the event of emergency and thus comes closer to the tongue body to clamp the webbing.

A tongue according to a second embodiment is characterized in that the locking member has a locking body, with a rectangular cross section, and clamps the webbing between a corner of the locking body and the tongue body.

A seatbelt apparatus according to a third embodiment of the invention comprises a webbing, a seatbelt retractor for winding up the webbing, a tongue slidably supported to the webbing, and a buckle into which the tongue is inserted for latching. The seatbelt is worn by an occupant by inserting the tongue into the buckle for latching. The tongue may be the same as, or similar to, the tongue of the first or second embodiment.

According to the tongue of the first embodiment having the aforementioned structure, the webbing guide and the locking member are held in their initial positions by the biasing force of the biasing mechanism in ordinary use. Since the spaces through which the webbing passes are ensured between the locking member and the tongue body in this state, little sliding friction is generated between the tongue and the webbing so as to ensure improved usability of the tongue during ordinary use. Since these spaces are set to be large, the curvature radius of the webbing when passing through the spaces can be set to be relatively large, thus further ensuring the improved usability of the tongue during ordinary use.

As a large pulling force exceeding a predetermined value is applied in the direction of the lap belt, the locking member is activated to cooperate together with the tongue body to clamp the webbing therebetween. Since the biasing force of the biasing mechanism biases the locking member in a direction of clamping the webbing, so that the force clamping the webbing at this point is composed of the pulling force exceeding the predetermined value and the biasing force of the biasing mechanism, a large clamping force can be obtained. Therefore, locking of the webbing by the locking member is secured so as to effectively limit the amount an occupant's lap moves.

According to the second embodiment, since the webbing is clamped by the corner of the rectangular locking body of the locking member, the clamping force is increased, thereby allowing the elimination of teeth or wave-shaped surfaces.

According to the seatbelt apparatus of the third embodiment, the locking of the webbing in the event of emergency is secured so as to effectively prevent the movement of an occupant's lap. In addition, improved usability of the tongue during ordinary use is provided to the occupant.

Hereinafter, best modes for carrying out the present invention will be described with reference to the attached drawings.

FIG. 1 is an exploded perspective view of an embodiment of a tongue of a seatbelt apparatus according to the present invention.

As shown in FIG. 1, a tongue 1 of this embodiment is adapted as a tongue for a conventional three-point type seatbelt apparatus as mentioned above. That is, a seatbelt apparatus comprising: a belt guide fixed to an upper portion of a vehicle body such as a center pillar; a seatbelt retractor fixed to a lower portion of the vehicle body; a webbing for restraining an occupant of which one end is fixed to the vehicle body and a second end that is wound into the seatbelt retractor to be freely pulled out from the seatbelt retractor after being guided by the belt guide; a tongue slidably supported to the webbing between the one end fixed to the vehicle body and the belt guide; and a buckle fixed to the vehicle body or the like. The tongue can be latched with the buckle, thereby restraining the occupant sitting in a vehicle seat.

The tongue 1 comprises a tongue body 4 which includes a tongue plate 2 made of metal and a tongue mold 3 partially covering the tongue plate 2 with resin, a webbing guide 5 which is attached to the tongue body 4 to allow relative rotation, a rotary shaft 6 which is inserted into a pair of mounting holes 4a, 4b of the tongue body 4 and into a through hole 5a of the webbing guide 5 so that the rotary shaft 6 is attached to the tongue body 4 to rotatably support the webbing guide 5, a locking bar 7 which is supported to the webbing guide 5 to allow relative rotation, a pair of rotary shafts 8, 9 composed of bolts which are inserted into a through hole 5b of the webbing guide 5 and a pair of mounting holes 7a, 7b of the locking bar 7, respectively, so as to rotatably support the locking bar 7, and a bar spring 10 which is attached to the tongue mold 3 and the locking bar 7 so as to always bias the locking bar 7 in one direction.

FIGS. 2(a)-2(c) show the tongue plate 2, wherein FIG. 2(a) is a front view thereof, FIG. 2(b) is a right side view thereof, and FIG. 2(c) is a top view thereof.

As shown in FIGS. 2(a) through 2(c), the tongue plate 2 is formed of a substantially T-shape metal plate having a lateral extending portion 2a and a vertical extending portion 2b which is formed integrally with the lateral extending portion 2a and extends vertically from a middle portion of the lateral extending portion 2a. The lateral extending portion 2a is provided with a large rectangular opening 2c extending laterally. The vertical extending portion 2b is provided with a rectangular opening 2d extending vertically. Similarly to a conventional tongue, a latch member of a buckle (not shown) is latched to the opening 2d extending vertically. That is, the vertical extending portion 2b has a structure which is a latching piece to be latched with the buckle. Hereinafter, the vertical extending portion 2b will be sometimes referred to as a latching piece 2b.

The lateral extending portion 2a is provided at both ends with a pair of side walls 2e, 2f. The side walls 2e, 2f are provided with holes 2g, 2h of the same size, respectively. In addition, the side walls 2e, 2f are provided with apertures 2i, 2j of the same size, respectively. As clearly shown in FIG. 2(b), one aperture 2i is formed of a T-like shape comprising a lateral aperture $2i_1$ opening the outer periphery of the side wall 2e and a vertical aperture $2i_2$ connecting to the lateral aperture $2i_1$, while the other aperture 2j is formed of a T-like shape, similarly to the aperture 2i, comprising a lateral aperture $2j_1$ and a vertical aperture $2j_2$ (though the numerals $2h, 2j_1, 2j_2$ are not shown in any drawing, these correspond to $2g, 2i_1, 2i_2$ and are used for the sake of convenience).

As shown in FIG. 1, the lateral extending portion 2a of the tongue plate 2 is almost entirely covered by the molding resin so as to form the tongue mold 3. In this regard, the inner peripheries of the pair of holes 2g, 2h are covered by the molding resin so as to form the pair of mounting holes 4a, 4b into which the rotary shaft 6 is fitted. The end of the aperture 2i on the right hand side in FIG. 2(a) and the end of the aperture 2j on the left hand side in FIG. 2(a) are closed with the molding resin and the inner peripheries of the pair of apertures 2i, 2j are covered by the molding resin so as to form guide grooves 4c, 4d, respectively, as shown in FIG. 1. One guide groove 4d is formed of a T-like shape comprising a vertical groove $4d_1$ opening upwardly and a lateral groove $4d_2$ connecting to the vertical groove $4d_1$, while the other guide groove 4c is formed of a T-like shape, similarly to the guide groove 4d, comprising a vertical groove $4c_1$ and a lateral groove $4c_2$ connecting to the vertical groove $4c_1$ (though the numerals $4c_1, 4c_2$ are not shown in any drawing, these correspond to $4d_1, 4d_2$ and are used for the sake of convenience). Further, the inner periphery of the opening 2c of the tongue plate 2 is covered by the molding resin so as to form the large rectangular opening 4e in the tongue body 4.

Figure 3C:
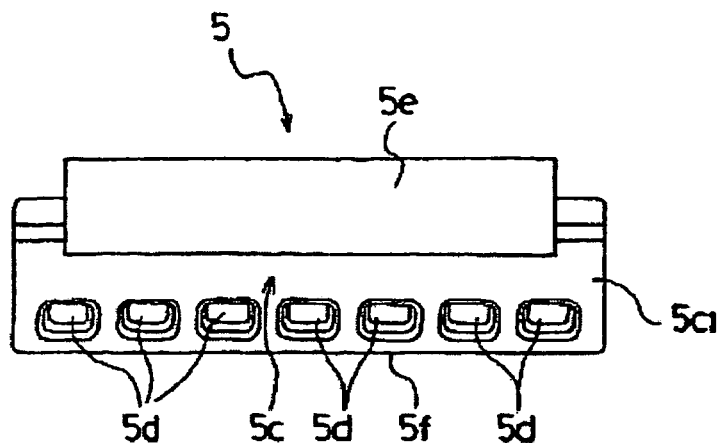
FIGS. 3(a)-3(c) show a webbing guide of the embodiment shown in FIG. 1.
Figure 3A:
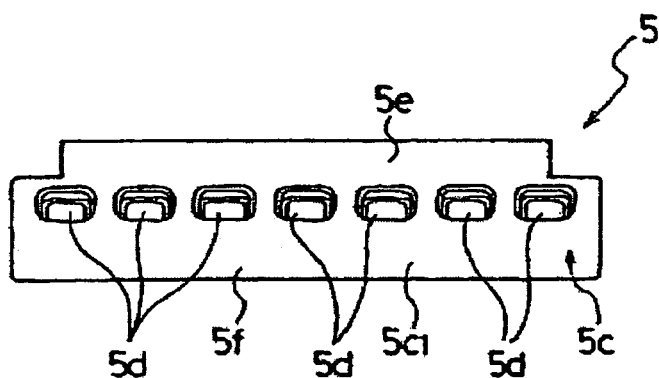
Figure 3B:
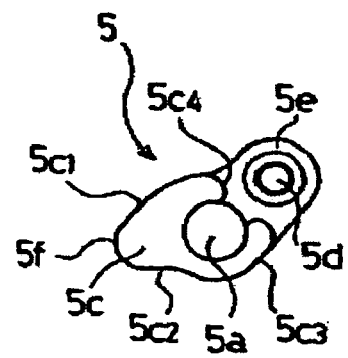

FIGS. 3(a)-3(c) show the webbing guide 5, wherein FIG. 3(a) is a front view thereof, FIG. 3(b) is a right side view thereof, and FIG. 3(c) is a top view thereof.

As shown in FIGS. 3(a) through 3(c), the webbing guide 5 comprises a relatively long guide body 5c which is formed to have a generally rectangular cross section and having four corners which are rounded into rounds of large diameter. Four faces $5c_1, 5c_2, 5c_3, 5c_4$ corresponding to the four sides of the rectangular guide body 5c are formed as curved surfaces which are outwardly slightly swelled. It should be understood that at least one of the four sides may be a flat face.

Formed in one face $5c_1$, the upper surface in FIG. 1, of the guide body 5c are a predetermined number (seven in the illustrative example) of rectangular concavities 5d. The aforementioned through hole 5a is formed in the guide body 5c to extend along the whole length of the guide body 5c. On another face $5c_4$, a mounting portion 5e is formed integrally with the guide body 5c to extend along the length of the guide body 5c. The aforementioned through hole 5b is formed in the mounting portion 5e to extend along the whole length of the mounting portion 5e.

A boundary portion including the corner between the face $5c_1$ and another face $5c_2$ extending downwardly from the face $5c_1$ of the guide body $5c$ is defined as a webbing guide portion $5f$ for guiding the webbing at the input side of the webbing guide 5. The other face $5c_4$ of the guide body $5c$ functions as a stopper as will be described later.

Figure 7A:
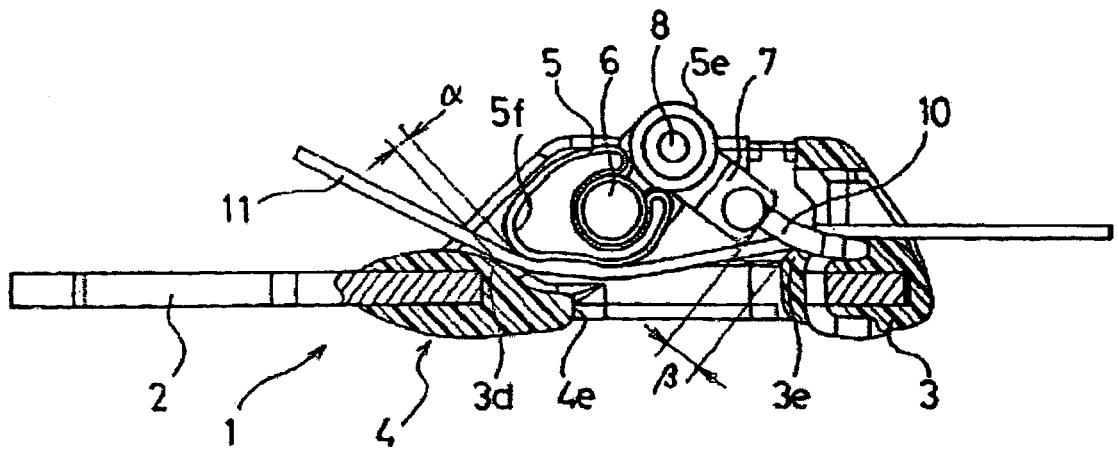
FIGS. 7(a)-7(c) are illustrations for explaining the action of the tongue of the embodiment shown in FIG. 1.
Figure 7B:
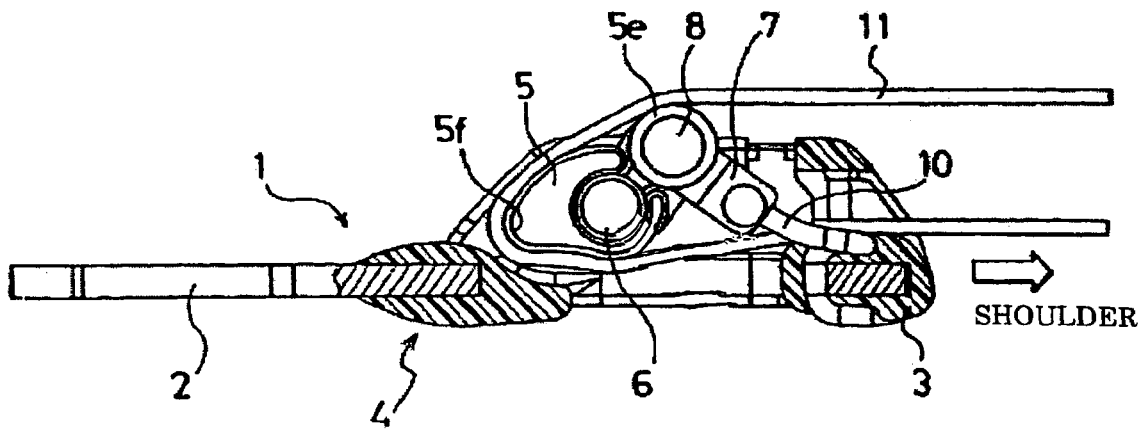
Figure 7C:
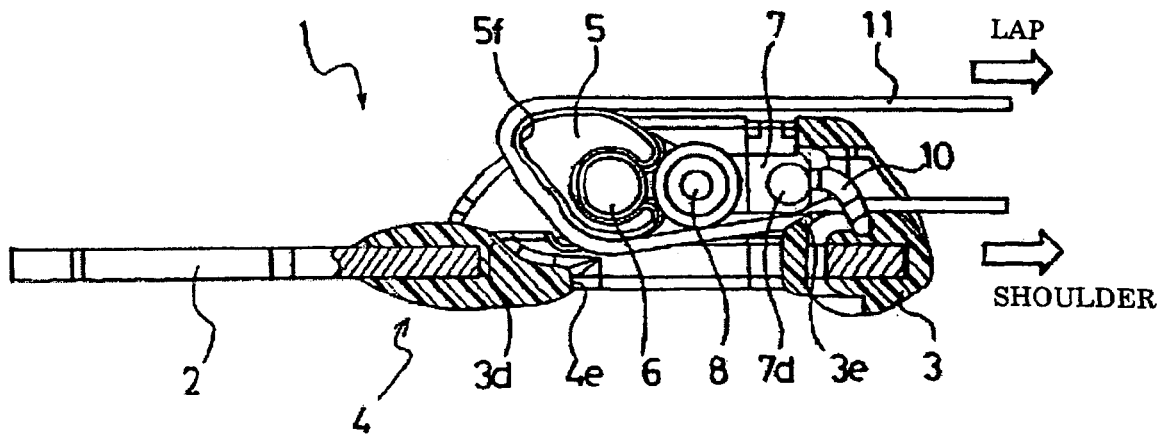

The rotary shaft 6 rotatably supporting the webbing guide 5 to the tongue body 4 is adapted also as a strength retaining member which can support large tension applied to the webbing 11 (numeral 11 is shown in FIGS. 7a-7c) in the event of emergency.

Figure 4B:
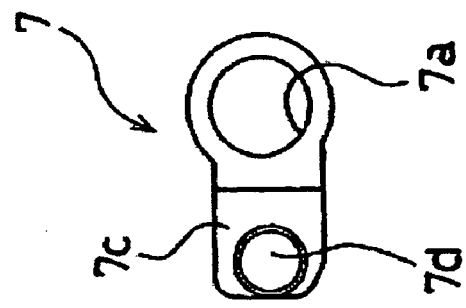
FIGS. 4(a)-4(c) show a locking bar of the embodiment shown in FIG. 1.
Figure 4C:
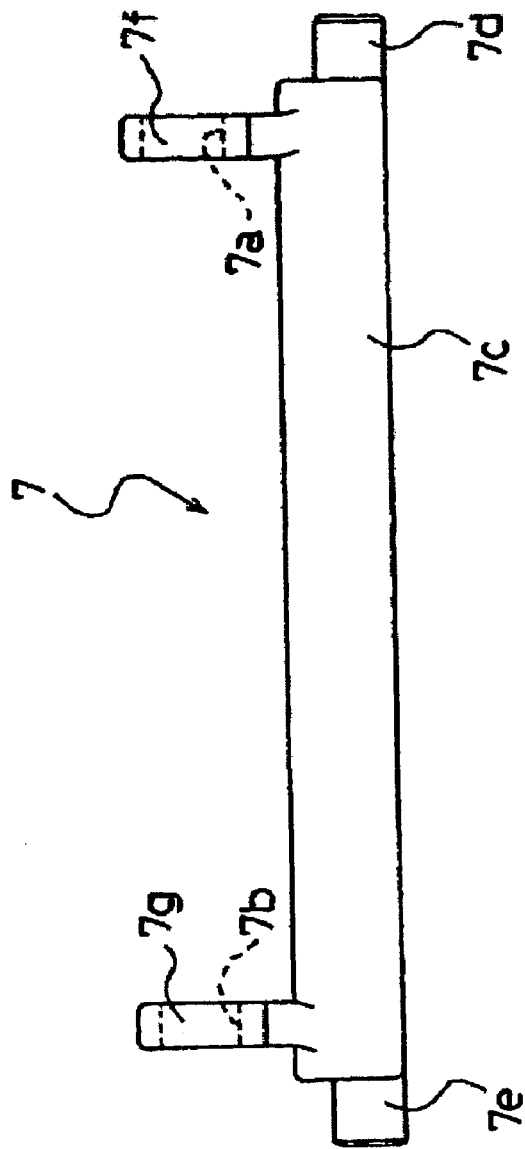
Figure 4A:
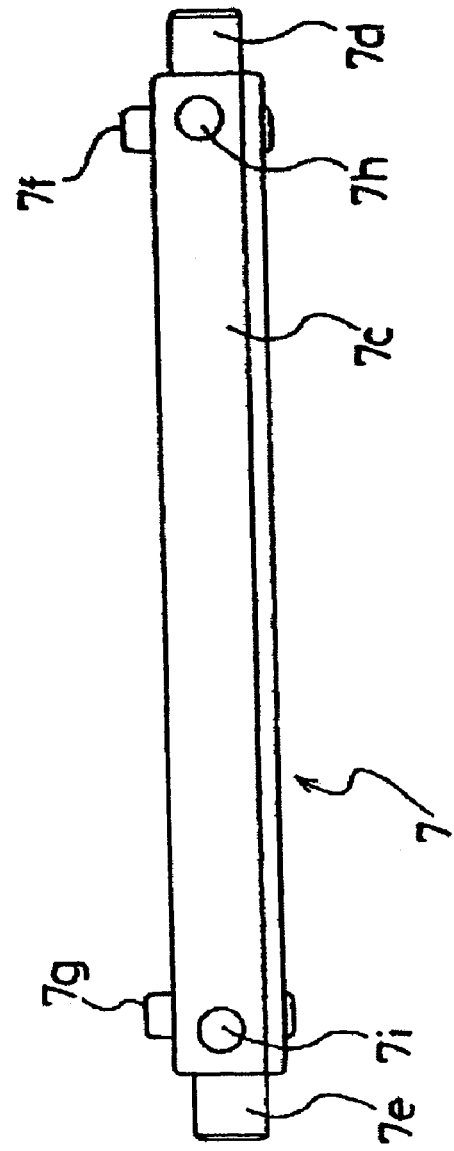

FIGS. 4(a)-4(c) show the locking bar 7, wherein FIG. 4(a) is a front view thereof, FIG. 4(b) is a right side view thereof, and FIG. 4(c) is a top view thereof.

As shown in FIGS. 4(a) through 4(c), the locking bar 7 comprises a long locking body 7c with a generally rectangular cross section. The locking body 7c is provided at its ends with guide shafts 7d, 7e, respectively. The guide shafts 7d, 7e are movably supported by the guide grooves 4c, 4d of the tongue body 4, respectively, to guide the locking body 7c. The locking body 7c is also provided at its ends with mounting portions 7f, 7g with circular cross sections and which are formed apart from each other by a predetermined distance to project from and integrally with the locking body 7c. The distance between the pair of the mounting portions 7f and 7g is set to allow the entry of the mounting portion 5e of the webbing guide 5 to the space between the mounting portions 7f and 7g. The aforementioned mounting holes 7a, 7b are formed in the mounting portions 7f, 7g, respectively. The locking body 7c is also provided at its both ends with mounting holes 7h, 7i of which cross section is circular.

Figure 5D:
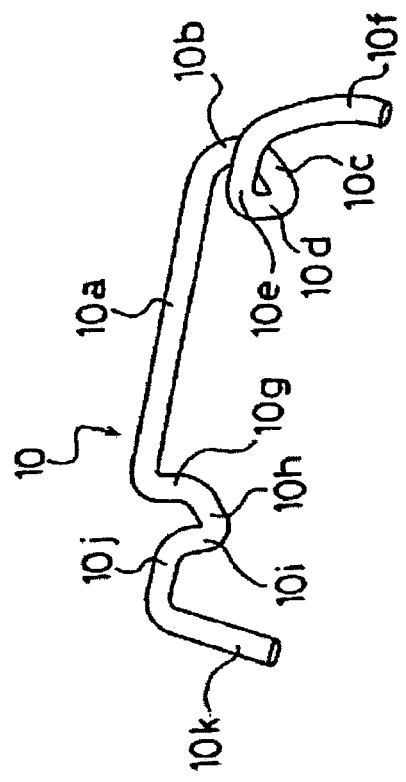
FIGS. 5(a)-5(d) show a bar spring of the embodiment shown in FIG. 1.
Figure 5B:
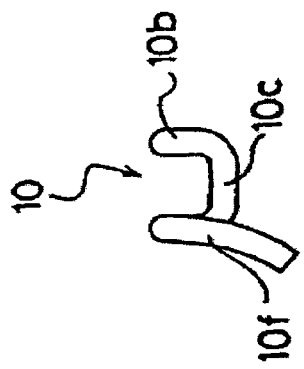
Figure 5C:
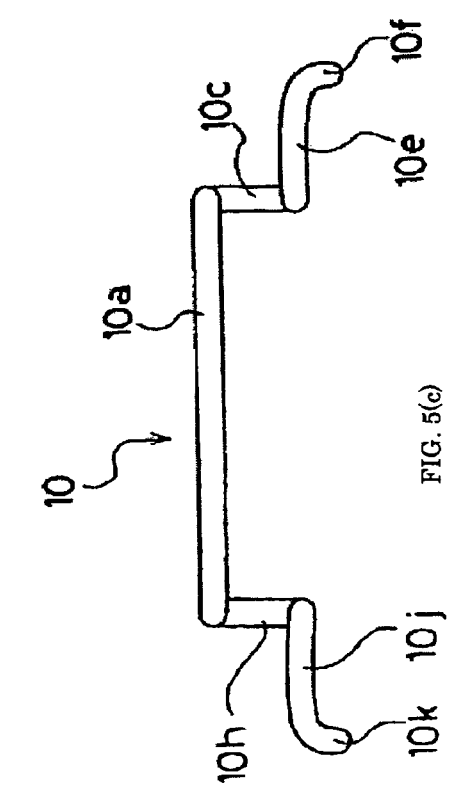
Figure 5A:
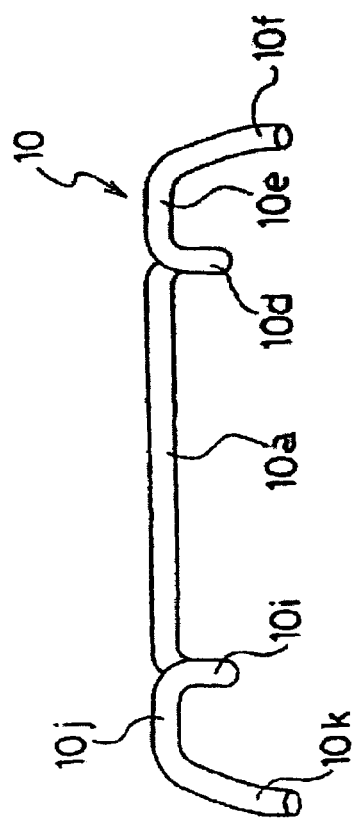

FIGS. 5(a)-5(d) show the bar spring 10, wherein FIG. 5(a) is a front view thereof, FIG. 5(b) is a right side view thereof, FIG. 5(c) is a top view thereof, and FIG. 5(d) is a perspective view thereof.

As shown in FIGS. 5(a) through 5(d), the bar spring 10 is composed of an elastic wire and has a relatively complex configuration which is symmetric as shown in FIG. 5(a) and FIG. 5(c). That is, as for the right side portion from a central first portion 10a of the bar spring 10, the right side portion comprises a second portion 10b which is bent from the first portion 10a to extend perpendicularly to the vertical direction, a third portion 10c which is bent from the second portion 10b to extend perpendicularly to both the first and second portions 10a, 10b, a fourth portion 10d which is bent from the third portion 10c to extend parallel to the second portion 10b, along the second portion 10b, and perpendicular to the third portion 10c, a fifth portion 10e which is bent from the fourth portion 10d to extend parallel to the first portion 10a in a direction apart from the first portion 10a and perpendicular to the fourth portion 10d, and a sixth portion 10f which is bent from the fifth portion 10e to extend in a direction apart from the first portion 10a and perpendicular to the fifth portion 10e. The left side portion from the central first portion 10a of the bar spring 10 comprises a second portion 10g, a third portion 10h, a fourth portion 10i, a fifth portion 10j, and a sixth portion 10k, corresponding to the respective portions of the right side portion.

The central first portion 10a of the bar spring 10 is fitted to a spring supporting portion 3a composed of a groove formed in the tongue mold 3 as shown in FIG. 1 so that the bar spring 10 is supported. In addition, the left and right sixth portions 10f, 10k are fitted into the mounting holes 7h, 7j of the locking bar 7, respectively, thereby attaching the bar spring 10.

The tongue 1 having the aforementioned structure is assembled, for example, as follows. The mounting portion $5e$ of the webbing guide 5 is positioned between the mounting portions 7f, 7g of the locking bar 7. In this state, the rotary shafts 8, 9 are inserted into the mounting holes 7a, 7b of the locking bar 7 and into the through hole 5b of the webbing guide 5, respectively, so that the locking bar 7 is mounted to the mounting portion 5e at the output side of the webbing guide 5 to allow relative rotation. The sixth portions 10f, 10k of the bar spring 10 are fitted into the mounting holes 7h, 7j of the locking bar 7, thereby mounting the bar spring 10 to the locking bar 7.

Figure 6:
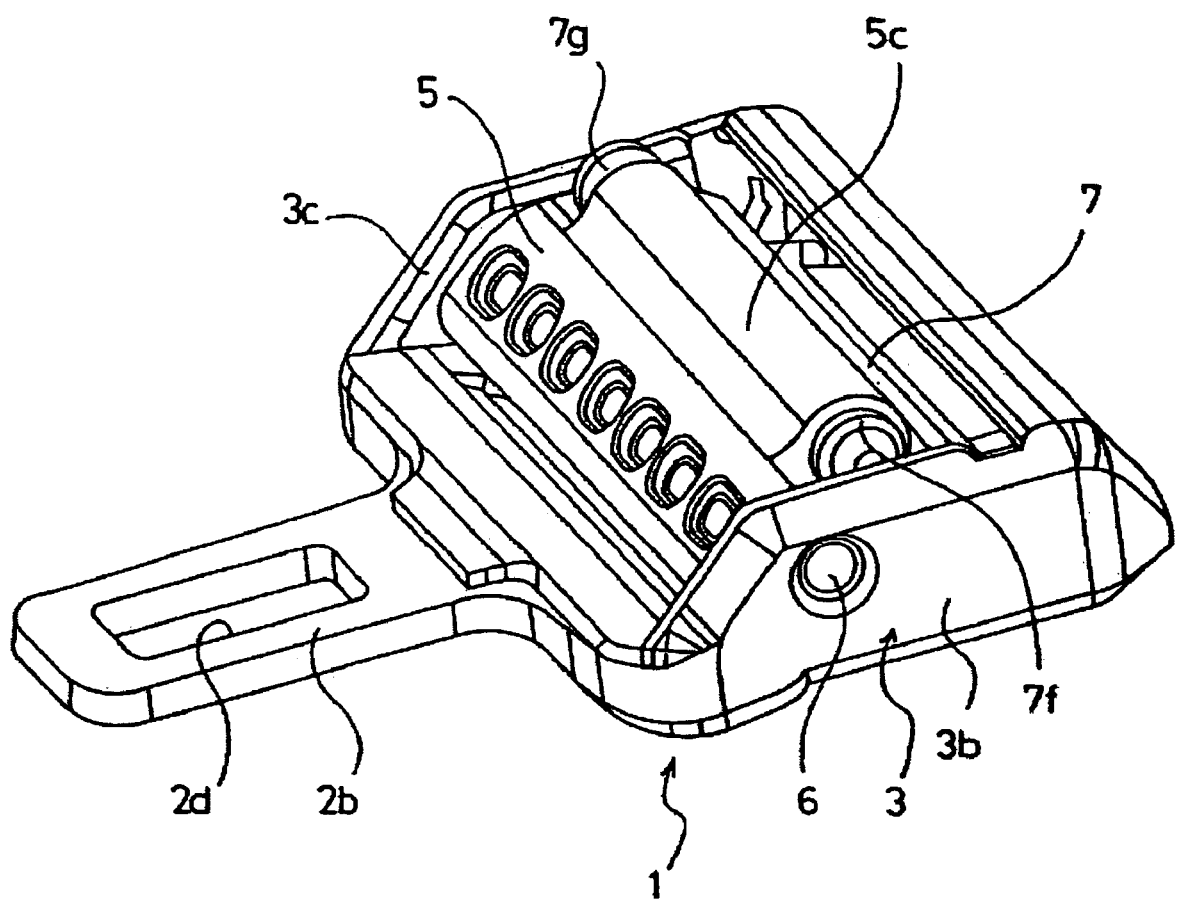
FIG. 6 is a perspective view of the tongue of the embodiment shown in FIG. 1.

As shown in FIG. 6, the webbing guide 5 is positioned between the left and right side walls 3b, 3c of the tongue mold 3 in such a manner that the webbing guide portion 5f faces the latching piece 2b of the tongue plate 2. The rotary shaft 6 is inserted into the mounting holes 4a, 4b of the tongue body 4 and into the through hole 5a of the webbing guide 5, thereby rotatably mounting the webbing guide 5 to the tongue body 4. In addition, the left and right guide shafts 7d, 7e of the locking bar 7 are slidably fitted to the lateral grooves $4c_2$, $4d_2$ through the vertical grooves $4c_1$, $4d_1$, of the guide grooves 4c, 4d, respectively.

Finally, the central first portion 10a of the bar spring 10 is fitted to the groove of the spring supporting portion 3a of the tongue mold 3. In this regard, the guide shafts 7d, 7e of the locking bar 7 are biased leftward in FIG. 7(a) by the biasing force of the bar spring 10 so as to move leftward along the lateral grooves $4c_2$, $4d_2$ of the guide grooves 4c, 4d of the tongue mold 3. At the same time, by the biasing force of the bar spring 10, a rotation moment in the counter-clockwise direction about the rotary shaft 6 is applied to the webbing guide 5 and the locking bar 7 so that the webbing guide 5 and the locking bar 7 rotate about the rotary shaft 6 in the counter-clockwise direction. In this regard, since the position of the rotary shaft 6 is fixed, the guide shafts 7d, 7e gradually move closer to the rotary shaft 6. Therefore, as shown in FIG. 7(a), the webbing guide 5 and the locking bar 7 pivot about the rotary shafts 8, 9 to change the relative angle such that the center of the rotary shafts 8, 9 is positioned above a line connecting the center of the rotary shaft 6 and the center of the guide shafts 7d, 7e.

The locking bar 7 comes in contact with the stopper, composed of the face $5c_4$ of the webbing guide 5, and is prevented from further pivoting relative to the webbing guide 5 so that the locking bar 7 and the webbing guide 5 are held in a state forming a substantially right angle therebetween. As the guide shafts 7d, 7e further move leftward and come in contact with ends of the lateral grooves $4c_2$, $4d_2$ of the guide groove 4c, 4d, the guide shafts 7d, 7e are prevented from further moving in the leftward direction so that the webbing guide 5 and the locking bar 7 are held in the initial positions shown in FIG. 7(a). In this manner, the tongue 1 is assembled.

In the state that the webbing guide 5 and the locking bar 7 are held in the initial positions shown in FIG. 7(a), a space a is formed between the webbing guide portion 5f of the webbing guide 5 and a portion 3d of the tongue mold 3 facing the webbing guide portion 5f and a space β is formed between a corner of the locking body 7c of the locking bar 7 and a portion 3e of the tongue mold 3 facing the corner. In the state shown in FIG. 7(a), these spaces α and β are set to the maximum which are significantly larger than the thickness of the webbing 11. Therefore, when the webbing 11 passes through the space a so that the webbing 11 is guided by the webbing guide 5 and the webbing 11 passes through the space β so that the tongue 1 is supported to the webbing 11, the tongue 1 can smoothly slide relative to the webbing 11 with little resistance. In addition, because of the opening 4e of the tongue body 4, the webbing 11 guided by the webbing guide 5 does not interfere with the tongue mold 3 so that the tongue 1 can further smoothly slide relative to the webbing 11. If the space α is too large, twisting of the webbing 11 is easily allowed. Therefore, the space a is set to be such a size that does not allow the webbing 11 to twist.

When a force larger than a predetermined magnitude causing a moment in the clockwise direction about the rotary shaft 6 is exerted to the webbing guide 5, the webbing guide 5 rotates in the clockwise direction against the moment by the biasing force of the bar spring 10. By the rotation of the webbing guide 5, the locking bar 7 rotates about the guide shafts 7d, 7e in the counter-clockwise direction so that the guide shafts 7d, 7e move linearly along the guide grooves 4c, 4d of the tongue mold 3. By the counter-clockwise rotation and the linear movement of the locking bar 7, the webbing 11 is clamped between the corner of the locking body 7c and the portion 3e of the tongue mold 3, thereby achieving locking.

That is, in the event of an emergency, the webbing guide 5 and the locking bar 7 cooperate together to compose an unwinding prevention mechanism for locking the webbing 11 to prevent the increase in length of the lap belt. In this regard, the rotation and the linear movement of the locking bar 7 increase the rotation of the webbing guide 5. Even though the rotation of the locking bar 7 is relatively small, the linear movement of the locking bar 7 is sufficient.

Hereinafter, the action of the tongue 1 of this embodiment will be described.

When the seatbelt is not used as shown in FIG. 7(a), the webbing 11 is wound into the seatbelt retractor (not shown) and the tongue 1 is in the stored state. When the tongue 1 is in the stored state, the webbing guide 5 and the locking bar 7 are held in the initial positions shown in FIG. 7(a) by the biasing force of the bar spring 10 and the stopper as mentioned above. Since the spaces α and β are set to the maximum in this state, the tongue 1 can smoothly slide relative to the webbing 11.

When an occupant is about to wear the seatbelt, he or she draws the tongue 1 from the stored position to insert the latching piece 2b of the tongue 1 into the buckle located on the other side for the latching. During this, the webbing 11 is drawn from the seatbelt retractor. Since the webbing guide 5 and the locking bar 7 are not rotated and are held in the initial positions, the tongue 1 smoothly slides relative to the webbing 11. As the occupant releases the tongue 1 after the tongue 1 is latched with the buckle, the excessively drawn part of the webbing 11 is wound into the seatbelt retractor so as to fit the webbing 11 to the occupant's body without giving a feeling of oppression to the occupant. At this point, the tongue 1 is in the state shown in FIG. 7(b). In the state shown in FIG. 7(b), the winding force of the seatbelt retractor acts on the webbing 11 so that the webbing 11 is in a state lightly pulled to the shoulder side of the occupant. Therefore, the webbing guide 5 and the locking bar 7 are held in the initial positions. In this state, the webbing 11 is in contact with the webbing guide portion 5f and is also in contact with the mounting portion 5e of the webbing guide 5.

In the event of an emergency, such as a vehicle collision where a large deceleration acts on the vehicle, the pretensioner (not shown) installed in the seatbelt retractor is activated. Accordingly, the webbing 11 is rapidly wound up by the seatbelt retractor and is thus pulled strongly to the shoulder side. Therefore, the webbing guide 5 and the locking bar 7 are still held in the initial positions.

After the termination of actuation of the pretensioner, an inertial force acts on the lap of the occupant in the forward direction so that the webbing 11 is pulled strongly to the lap side of the occupant. The pulling force to the lap side of the webbing 11 acts on the webbing guide portion 5f of the webbing guide 5 and the mounting portion 5e so that a large moment in the clockwise direction about the rotary shaft 6 is applied to the webbing guide 5. By this moment, the webbing guide 5 rotates in the clockwise direction about the rotary shaft 6 and, at the same time, the locking bar 7 rotates in the counter-clockwise direction about the guide shafts 7d, 7e and the guide shafts 7d, 7e move linearly along the lateral grooves $4c_2$, $4d_2$ of the guide grooves 4c, 4d of the tongue mold 3 from one end to the other end of the lateral grooves $4c_2$, $4d_2$, (i.e. rightward in FIG. 7(b)).

By the clockwise rotation of the webbing guide 5 and the counter-clockwise rotation and the linear movement of the locking bar 7, the corner of the locking body 7c of the locking bar 7 moves closer to the portion 3e of the tongue mold 3 so as to reduce the space β. Accordingly, the webbing 11 is clamped between the corner of the locking body 7c and the portion 3e of the tongue mold 3 as shown in FIG. 7(c). Since the locking bar 7 rotates and linearly moves, a sufficient amount of the linear movement is ensured even with a small amount of rotation, thereby providing a large clamping force to the webbing 11.

In the state that the webbing 11 is clamped between the corner of the locking body 7c and the portion 3e of the tongue mold 3, the center of the rotary shafts 8, 9 connecting the webbing guide 5 and the locking bar 7 is positioned slightly below the straight line connecting the center of the rotary shaft 6 and the center of the guide shafts 7d, 7e. Accordingly, the biasing force of the bar spring 10 acts in such a manner as to rotate the webbing guide 5 and the locking bar 7 about the rotary shaft 6 in the clockwise direction. That is, the force clamping the webbing 11 by the corner of the locking body 7c and the portion 3e of the tongue mold 3 is further increased by the force pulling the webbing 11 to the lap side and the biasing force of the bar spring 10. Therefore, the webbing 11 is firmly clamped between the corner of the locking body 7c and the portion 3e of the tongue mold 3. This means that the locking of the webbing 11 by the locking bar 7 is securely conducted so that the webbing 11 is prevented from sliding between the corner of the locking body 7c and the portion 3e of the tongue mold 3, thereby preventing the increase in length of the webbing 11 and thus securing the restraint of the occupant by the webbing 11.

According to this embodiment, in the ordinary use, the webbing guide 5 and the locking bar 7 are held in the initial positions by the biasing force of the bar spring 10, thus securing the aforementioned predetermined spaces α and β through which the webbing passes. Therefore, little sliding friction is generated between the tongue 1 and the webbing 11 so as to ensure improved usability of the tongue 1 in the ordinary use. Since these spaces α and β are set to be large, the curvature radius of the webbing when passing through the spaces α and β can be set to be relatively large, thus further ensuring the improved usability of the tongue 1 in the ordinary use.

As a large pulling force exceeding a predetermined value is applied in the direction of the lap belt, the webbing guide 5 rotates and the locking bar 7 rotates and linearly moves, whereby the webbing 11 is clamped between the locking bar 7 and the tongue mold 3. Since the force clamping the webbing 11 at this point is composed of the pulling force in the direction of the lap belt and the biasing force of the bar spring 10, a large clamping force can be obtained. Therefore, the locking of the webbing 11 by the locking bar 7 is secured so as to effectively limit the moving amount of the occupant's lap. In addition, since the webbing 11 is clamped by the corner of the rectangular locking body 7c of the locking bar 7, the clamping force must be increased, thereby allowing the elimination of teeth or wave-shaped surfaces from the locking body 7c.

Further, since the locking mechanism for the webbing 11 is composed of two pieces, i.e. the webbing guide 5 and the locking bar 7 which are connected to each other to allow relative pivotal movement, a large rotation amount of the input side of the webbing guide 5 to which the locking bar 7 is connected is secured, while the linear movement of the locking bar 7 is secured even with a small rotation amount of the output side of the webbing guide 5, thereby making the locking mechanism of the tongue 1 compact while ensuring the locking of the webbing 11.

By adopting the tongue 1 of this embodiment to a tongue of a conventional three-point type seatbelt apparatus, the locking of the webbing 11 in the event of an emergency (vehicle collision) is secured so as to effectively prevent the movement of an occupant's lap. In addition, improved usability of the tongue 1 during ordinary use can be provided to the occupant.

The tongue of embodiments of the present invention can be used with a seatbelt apparatus installed in a vehicle for restraining an occupant with a seatbelt thereof and which is slidably supported to the seatbelt and can be latched with a buckle.

Japan Priority Application 2004-375760, filed Dec. 27, 2004 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A tongue which is slidably supported on a webbing and can be latched with a buckle, the tongue comprising:
   a tongue body;
   a locking mechanism rotatably attached to the tongue body, wherein during a vehicle collision state where a large deceleration acts on the vehicle, the locking mechanism activates to cooperate together with the tongue body to clamp the webbing therebetween, the locking mechanism includes:
      a webbing guide rotatably supported to the tongue body to guide the webbing; and
      a locking member connected to the webbing guide to allow relative rotation and, in operation, cooperates together with the tongue body to clamp the webbing therebetween; and
   a biasing mechanism configured to bias the locking member during a non-collision state in a direction away from the tongue body to set an initial position where a predetermined space is formed between the locking member and the tongue body through which the webbing passes, and the biasing mechanism is configured to bias the locking member in a direction of clamping the webbing when the locking member is actuated by a pulling force exceeding a predetermined value applied to the webbing during a vehicle collision state such that the tongue body clamps the webbing.

2. The tongue as claimed in claim 1, wherein the locking member includes a locking body with a rectangular cross-section, and the locking member clamps the webbing between a corner of the locking body and the tongue body.

3. A seatbelt apparatus comprising:
   a webbing;
   a tongue slidably supported on the webbing, the tongue includes:
      a tongue body; and
      a locking mechanism rotatably attached to the tongue body, wherein during a vehicle collision state where a large deceleration acts on the vehicle, the locking mechanism activates to cooperate together with the tongue body to clamp the webbing therebetween, the locking mechanism includes:
         a webbing guide rotatably supported to the tongue body to guide the webbing; and
         a locking member connected to the webbing guide to allow relative rotation and, in operation, cooperates together with the tongue body to clamp the webbing therebetween; and
      a biasing mechanism configured to bias the locking member during a non-collision state in a direction away from the tongue body to set an initial position where a predetermined space is formed between the locking member and the tongue body through which the webbing passes, and the biasing mechanism is configured to bias the locking member in a direction of clamping the webbing when the locking member is actuated by a pulling force exceeding a predetermined value applied to the webbing during a vehicle collision state such that the tongue body clamps the webbing.

4. The seatbelt apparatus as claimed in claim 3, wherein the locking member includes a locking body with a rectangular cross-section, and the locking member clamps the webbing between a corner of the locking body and the tongue body.

* * * * *